(12) United States Patent
Ge

(10) Patent No.: US 11,185,055 B2
(45) Date of Patent: Nov. 30, 2021

(54) BIRD FEEDER

(71) Applicant: Zhimin Ge, Zhejiang (CN)

(72) Inventor: Zhimin Ge, Zhejiang (CN)

(73) Assignee: Taizhou Huangyan Jingying Design Co., Ltd., Taizhou (CN)

( * ) Notice: Subject to any disclaimer, the term of this patent is extended or adjusted under 35 U.S.C. 154(b) by 0 days.

(21) Appl. No.: 17/030,408

(22) Filed: Sep. 24, 2020

(65) Prior Publication Data

US 2021/0007331 A1 Jan. 14, 2021

(51) Int. Cl.
*A01K 39/012* (2006.01)
*A01K 31/12* (2006.01)

(52) U.S. Cl.
CPC .......... *A01K 39/0125* (2013.01); *A01K 31/12* (2013.01)

(58) Field of Classification Search
CPC .... A01K 39/0125; A01K 31/12; A01K 39/01; A01K 39/0113; A01G 9/024; A47G 7/047
See application file for complete search history.

(56) References Cited

U.S. PATENT DOCUMENTS

| | | | | |
|---|---|---|---|---|
| 3,827,405 A | * | 8/1974 | Allen | A01K 39/0125 119/53 |
| 4,712,512 A | * | 12/1987 | Schreib | A01K 39/0113 119/52.2 |
| 5,937,787 A | * | 8/1999 | Kopis | A01K 39/01 119/57.8 |
| 6,311,641 B1 | * | 11/2001 | Johnson | A01K 39/014 119/57.8 |
| 6,543,384 B2 | * | 4/2003 | Cote | A01K 39/0113 119/57.9 |
| 7,171,921 B1 | * | 2/2007 | Lush | A01K 39/0113 119/57.9 |
| 8,230,809 B2 | * | 7/2012 | Cote | A01K 39/0113 119/52.3 |
| 9,265,237 B2 | * | 2/2016 | Cote | A01K 39/0113 |
| 9,277,735 B2 | * | 3/2016 | Murray | A01K 39/012 |
| 9,282,726 B2 | * | 3/2016 | Cote | A01K 39/0113 |
| 9,351,479 B2 | * | 5/2016 | Chen | A01K 39/0206 |
| 9,609,852 B2 | * | 4/2017 | Cote | A01K 39/0113 |
| 2002/0139311 A1 | * | 10/2002 | Cote | A01K 39/0113 119/57.9 |
| 2003/0226514 A1 | * | 12/2003 | Cote | A01K 39/0113 119/57.9 |
| 2005/0211177 A1 | * | 9/2005 | Bescherer | A01K 39/012 119/57.8 |
| 2007/0163505 A1 | * | 7/2007 | Lynch | A01K 39/012 119/52.1 |
| 2008/0022936 A1 | * | 1/2008 | Stone | A01K 39/012 119/52.2 |
| 2008/0105206 A1 | * | 5/2008 | Rich | A01K 39/0113 119/57.9 |
| 2008/0257273 A1 | * | 10/2008 | Carter | A01K 39/026 119/72 |

(Continued)

*Primary Examiner* — Robert E Fuller
*Assistant Examiner* — Nicholas Leo Seneczko

(57) ABSTRACT

A bird feeder includes a pushbutton activated positioning mechanism in a hub of a hinged cover for fastening or unfastening a rope having a bottom end secured to a feeding pan. The cover is releasably secured to a seed container by a latch. Together they prevent the cover from being accidentally disengaged from the seed container.

4 Claims, 11 Drawing Sheets

(56) References Cited

U.S. PATENT DOCUMENTS

| | | | | |
|---|---|---|---|---|
| 2008/0302304 | A1* | 12/2008 | Mayfield | A01K 39/01 119/51.01 |
| 2010/0230570 | A1* | 9/2010 | Vosbikian | A47G 7/047 248/311.2 |
| 2011/0073043 | A1* | 3/2011 | Dault | A01K 39/0125 119/57.9 |
| 2011/0083610 | A1* | 4/2011 | Cote | A01K 39/0113 119/52.3 |
| 2011/0126771 | A1* | 6/2011 | Cote | A01K 39/0113 119/52.3 |
| 2012/0037080 | A1* | 2/2012 | Hepp | A01K 29/00 119/52.3 |
| 2013/0098297 | A1* | 4/2013 | Chen | A01K 39/012 119/51.01 |
| 2013/0255582 | A1* | 10/2013 | Donegan | A01K 39/01 119/57.8 |
| 2014/0261200 | A1* | 9/2014 | Tu | A01K 39/01 119/57.8 |
| 2015/0173329 | A1* | 6/2015 | Barr | A01K 39/0113 119/52.3 |
| 2015/0296750 | A1* | 10/2015 | Cote | A01K 39/0113 119/57.8 |
| 2015/0342154 | A1* | 12/2015 | DiOrio | C11D 3/30 119/52.2 |
| 2015/0366168 | A1* | 12/2015 | Cote | A01K 39/012 119/52.2 |
| 2016/0113247 | A1* | 4/2016 | McCord | A01K 5/0142 119/52.3 |
| 2016/0262357 | A1* | 9/2016 | Cole | A01K 39/012 |
| 2016/0353065 | A1* | 12/2016 | Nicholson | H04N 1/00209 |
| 2016/0366319 | A1* | 12/2016 | Perkins | H04N 5/23203 |
| 2017/0135321 | A1* | 5/2017 | Charleston | A01K 7/02 |
| 2017/0258073 | A1* | 9/2017 | Lynders | A01K 39/01 |
| 2017/0339926 | A1* | 11/2017 | Cote | A01K 39/0113 |
| 2018/0360000 | A1* | 12/2018 | Cahill | A01K 39/0113 |
| 2019/0014751 | A1* | 1/2019 | Loo | A01K 39/0125 |
| 2019/0098875 | A1* | 4/2019 | McFerrin | A01K 39/01 |
| 2019/0159432 | A1* | 5/2019 | Bruno | A01K 39/0125 |
| 2021/0007331 | A1* | 1/2021 | Ge | A01K 31/12 |

* cited by examiner

BIRD FEEDER

BACKGROUND OF THE INVENTION

1. Field of the Invention

The invention relates to bird feeders and more particularly to a bird feeder including a pushbutton activated positioning mechanism for fastening or unfastening a rope, and a hinged cover which can be releasably secured to a seed container by a latch, together adapted to prevent the cover from being accidentally disengaged from the seed container.

2. Description of Related Art

Bird feeders are known and are customarily used to contain feed seeds to be made available and accessible to birds in an attractive manner. Bird feeders typically have a hinged cover or a rotary cover. It is difficult of placing feed seeds in a seed container of the bird feeder having the rotary cover. Thus, most commercially available bird feeders have a hinged cover.

However, a drawback of the bird feeder having a hinged cover is the weak attachment of the cover and the seed container. It is often that the cover may be accidentally disengaged from the seed container. Another drawback of the bird feeder having a hinged cover is that it is difficult of repairing the bird feeder and mounting same again if such disengagement occurs. This is because typically a bird feeder is installed at a place above the ground for preventing rodents or other animals from approaching and the place is far away from people living areas.

Thus, the need for improvement still exists.

SUMMARY OF THE INVENTION

The invention has been made in an effort to solve the problems of the conventional art including the cover being accidentally disengaged from the seed container by providing a bird feeder having novel and nonobvious characteristics.

To achieve above and other objects of the invention, the invention provides a bird feeder comprising a cover comprising a hub extending upward, a lateral receptacle in the hub, and a latch extending downward; a feeding pan; a positioning mechanism disposed in the lateral receptacle and comprising an open cavity, a first biased button in the open cavity and partially extending out of the lateral receptacle, and a longitudinal hole through the open cavity; a seed container disposed on the feeding pan and comprising a feeding chamber hingedly secured to the cover and a discharging chamber releasably secured to the feeding chamber and the feeding pan respectively wherein the feeding chamber includes a recessed member disposed on an upper edge, and a second biased button disposed in the recessed member; and a rope passing through the longitudinal hole and the hub to extend out of the cover; wherein the rope is fastened by the first biased button in a closed state of the cover, and the first biased button is configured to unfasten the rope by pressing; and wherein the latch is fastened in the recessed member by the second biased button in the closed state of the cover, and the second biased button is configured to unfasten the latch by pressing.

Preferably, the discharging chamber includes a plurality of openings on a bottom edge, a plurality of spaced rails on an outer surface adjacent to a top edge, each rail having a recess on a bottom, an outwardly extending sealing ring on the top edge, the sealing ring having a height equal to that of the rail, and a plurality of protrusions extending inward from a bottom edge, each opening being disposed between two adjacent protrusions, each protrusion having a well on an intermediate portion; and wherein the feeding chamber further comprises a plurality of sliding grooves on an inner surface adjacent to a bottom edge, each sliding groove having a projection on a bottom, the projection being lockingly disposed in the recess when the rail is disposed in the sliding groove.

Preferably, the feeding pan comprises a cylindrical wall around the discharging chamber, a plurality of spaced drain holes through the cylindrical wall, and a central boss inside the cylindrical wall, the central boss being secured to a first end of the rope and including a plurality of spaced apart protuberances extending outwardly from a bottom edge, each protuberance having a sliding trough with a projecting member on an intermediate portion, the projecting member being complimentarily engaged with the well when the protrusion is disposed in the sliding trough.

Preferably, the feeding pan further comprises a decorated perch along an edge.

The invention has the following advantageous effects in comparison with the prior art: The pushbutton activated positioning mechanism is provided in the hub of the hinged cover for fastening or unfastening the rope having a bottom end secured to the feeding pan. The cover is releasably secured to the seed container by the latch. Together they prevent the cover from being accidentally disengaged from the seed container.

The above and other objects, features and advantages of the invention will become apparent from the following detailed description taken with the accompanying drawings.

DETAILED DESCRIPTION OF THE INVENTION

Figure 1:
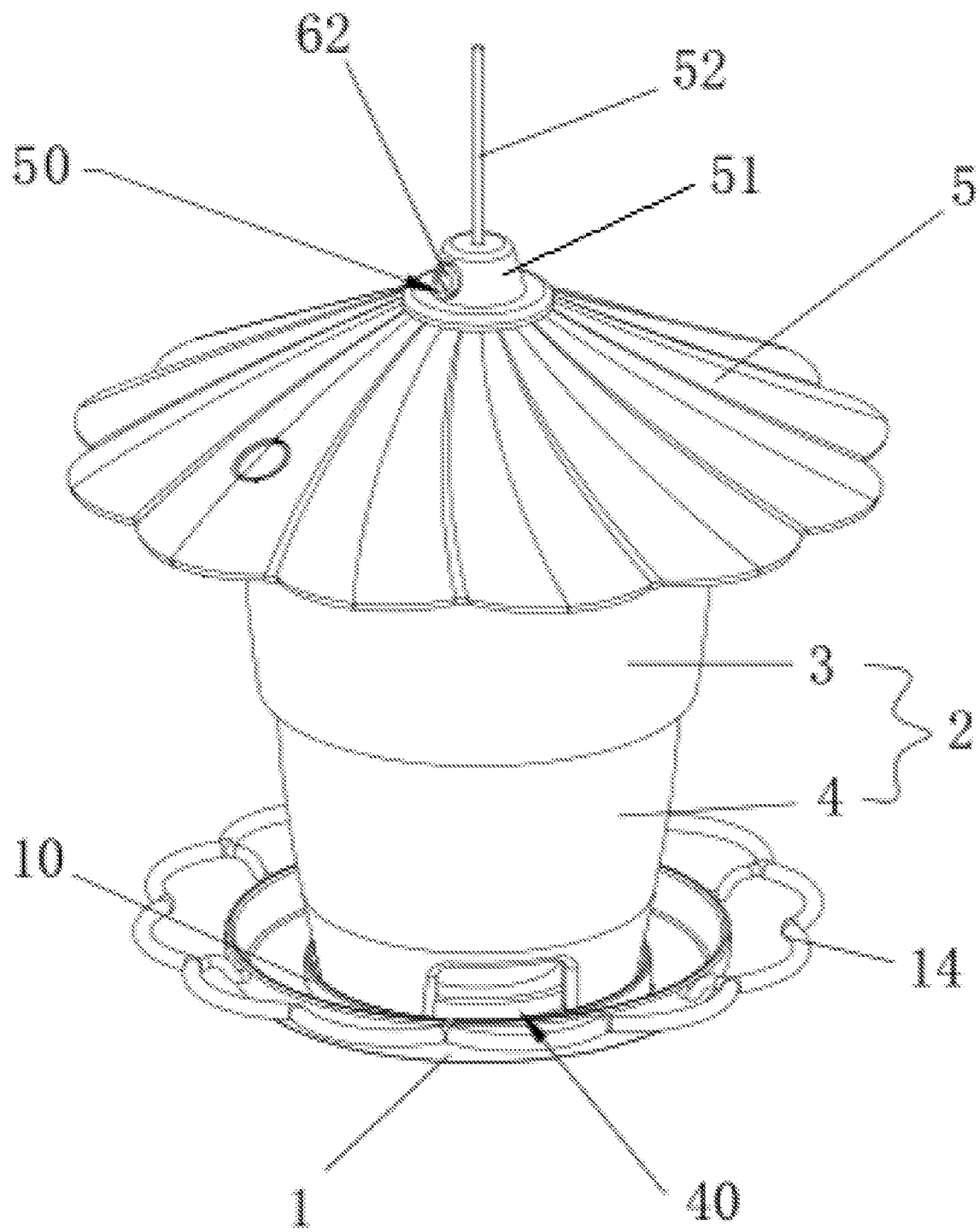
FIG. 1 is a perspective view of a bird feeder according to a first preferred embodiment of the invention.

Referring to FIGS. 1 to 9, a bird feeder in accordance with a first preferred embodiment of the invention comprises a feeding pan 1, a seed container 2 on the feeding pan 1, and a cover 5 on the seed container 2. The seed container 2 includes a feeding chamber 3 hingedly secured to the cover 5, and a discharging chamber 4 releasably secured to the feeding chamber 3 and the feeding pan 1 respectively. The discharging chamber 4 includes a plurality of openings 40 on a bottom edge. The cover 5 includes a central rope 52. The feeding pan 1 includes a cylindrical wall 10 around the discharging chamber 4, and a central boss 11 inside the wall 10 and having a center secured to a first end of the rope 52, a decorated perch 14 along an edge, and three spaced drain holes 15 through the wall 10. Excess water in the seed container 2 may flow through the drain holes 15 to the sloped bottom of feeding pan 1 for draining. This can prevent the contents in the seed container 2 from be damaged due to moisture accumulation.

Figure 2:
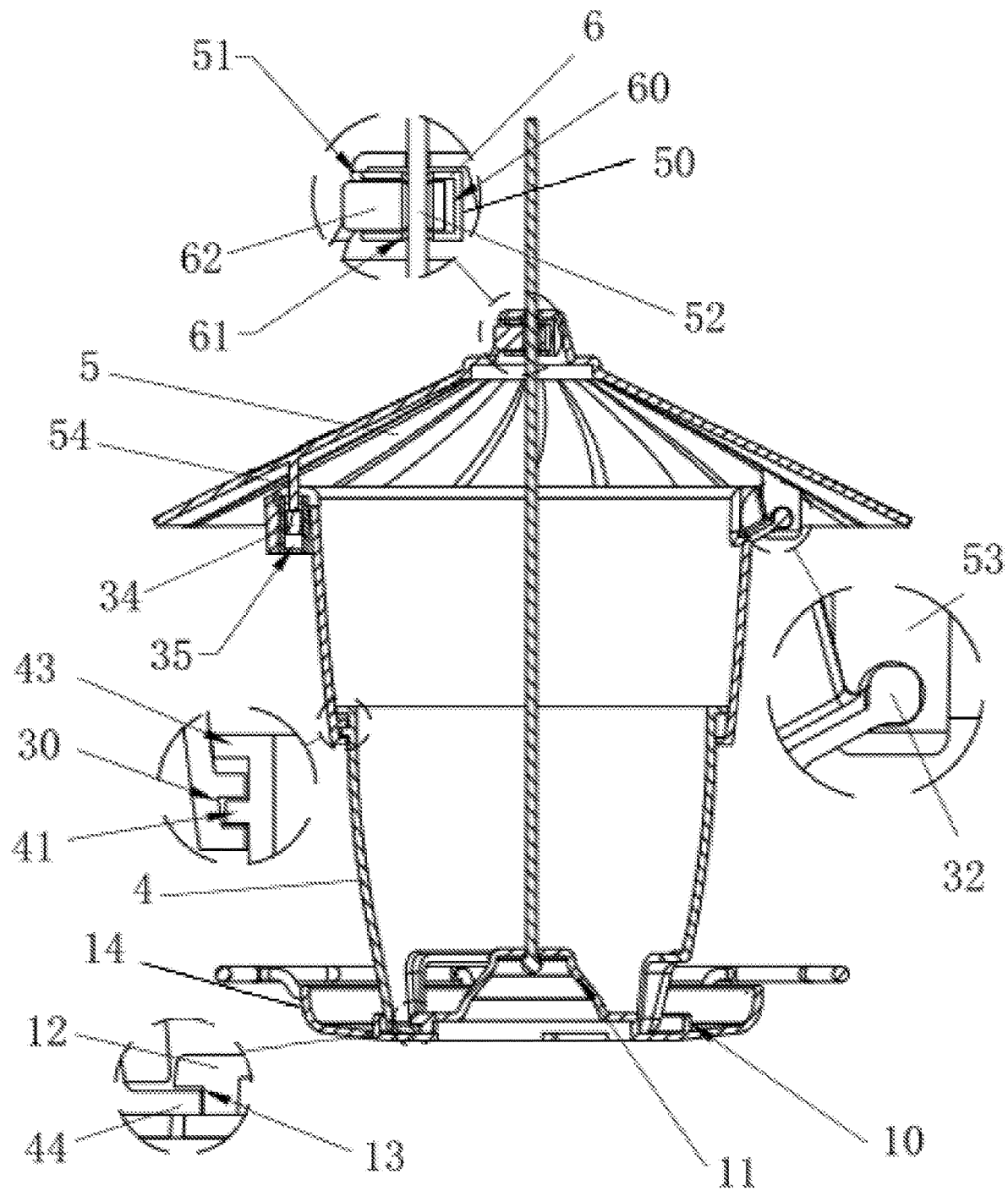
FIG. 2 is a longitudinal sectional view of the bird feeder having three portions being greatly enlarged to show details.

As shown in FIGS. 1 and 2 specifically, the cover 5 further comprises a hub 51 extending upward and a lateral receptacle 50 in the hub 51 for the receipt of a positioning mechanism 6 which includes an open cavity 60, a first biased button 62 in the cavity 60 and partially extending out of the receptacle 50, and a longitudinal hole 61 through the cavity 60. The rope 52 passes through the longitudinal hole 61 and the hub 51 to extend out of the cover 5.

The first biased button 62 normally maintains its set position to fasten the rope 52 when released by an operator. Further, the first biased button 62 may spring into another position to unfasten the rope 52 when pressed by the operator.

Figure 4:
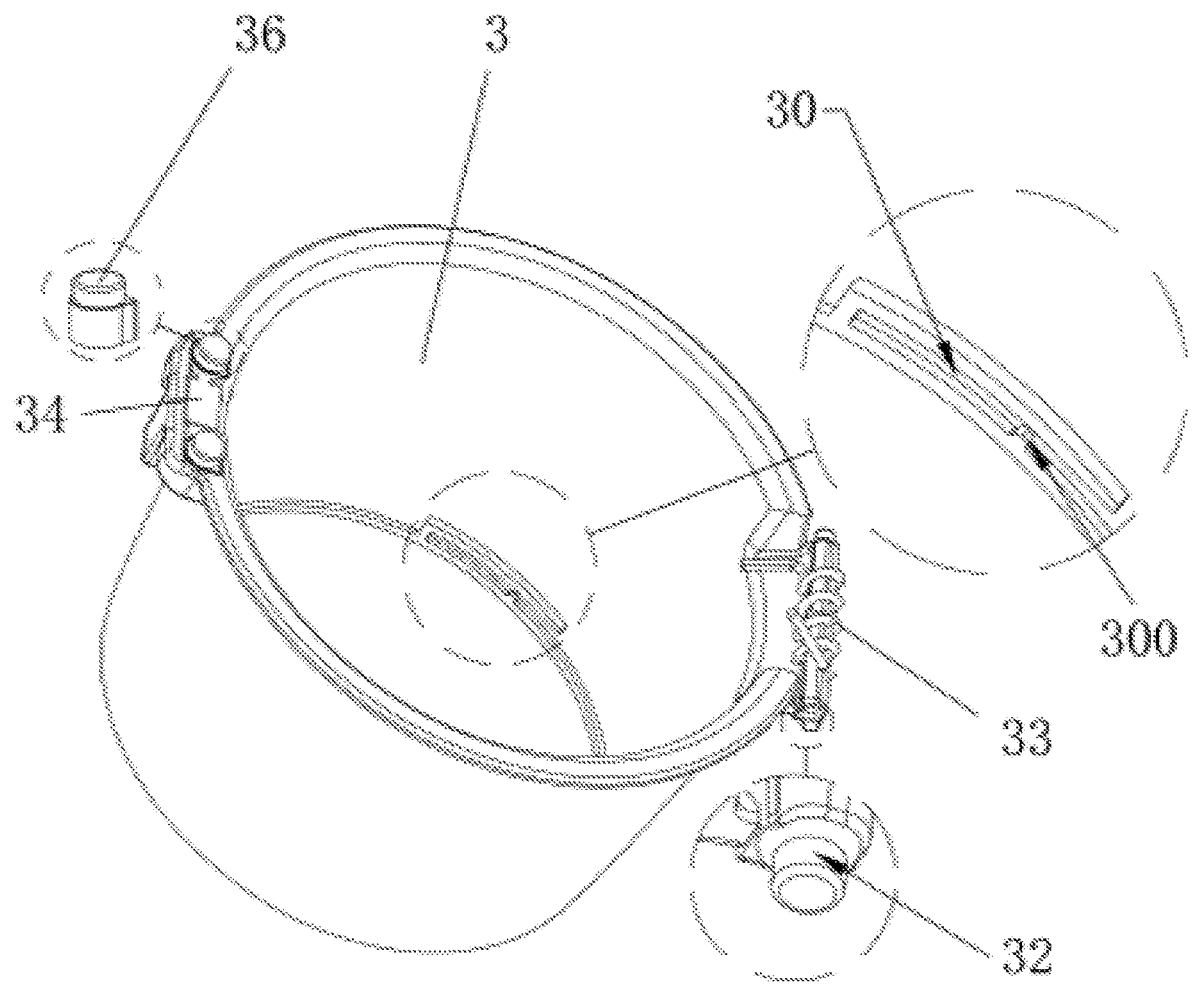
FIG. 4 is a perspective view of the feeding chamber having three portions being greatly enlarged to show details.
Figure 5:
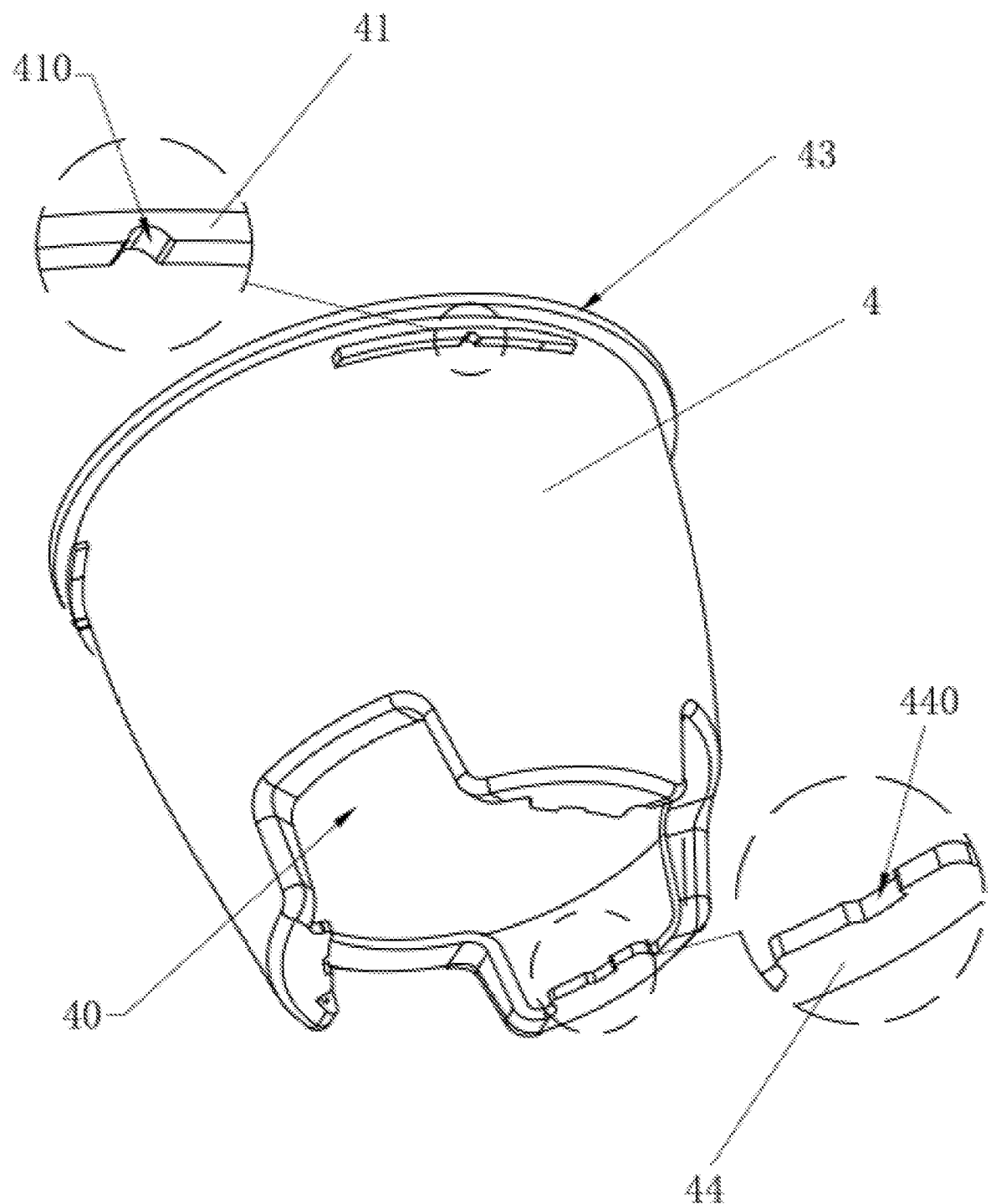
FIG. 5 is a perspective view of the discharging chamber having two portions being greatly enlarged to show details.

As shown in FIGS. 2, 4 and 5 specifically, the feeding chamber 3 includes a plurality of sliding grooves 30 on an inner surface adjacent to a bottom edge, each sliding groove 30 having a projection 300 on a bottom. The discharging chamber 4 includes a plurality of spaced rails 41 on an outer surface adjacent to a top edge, the rail 41 having a recess 410 on a bottom, and an outwardly extending sealing ring 43 on the top edge, the sealing ring 43 having a height equal to that of the rail 41. The projection 300 is lockingly disposed in the recess 410 when the rail 41 slides into the sliding groove 30.

Figure 6:
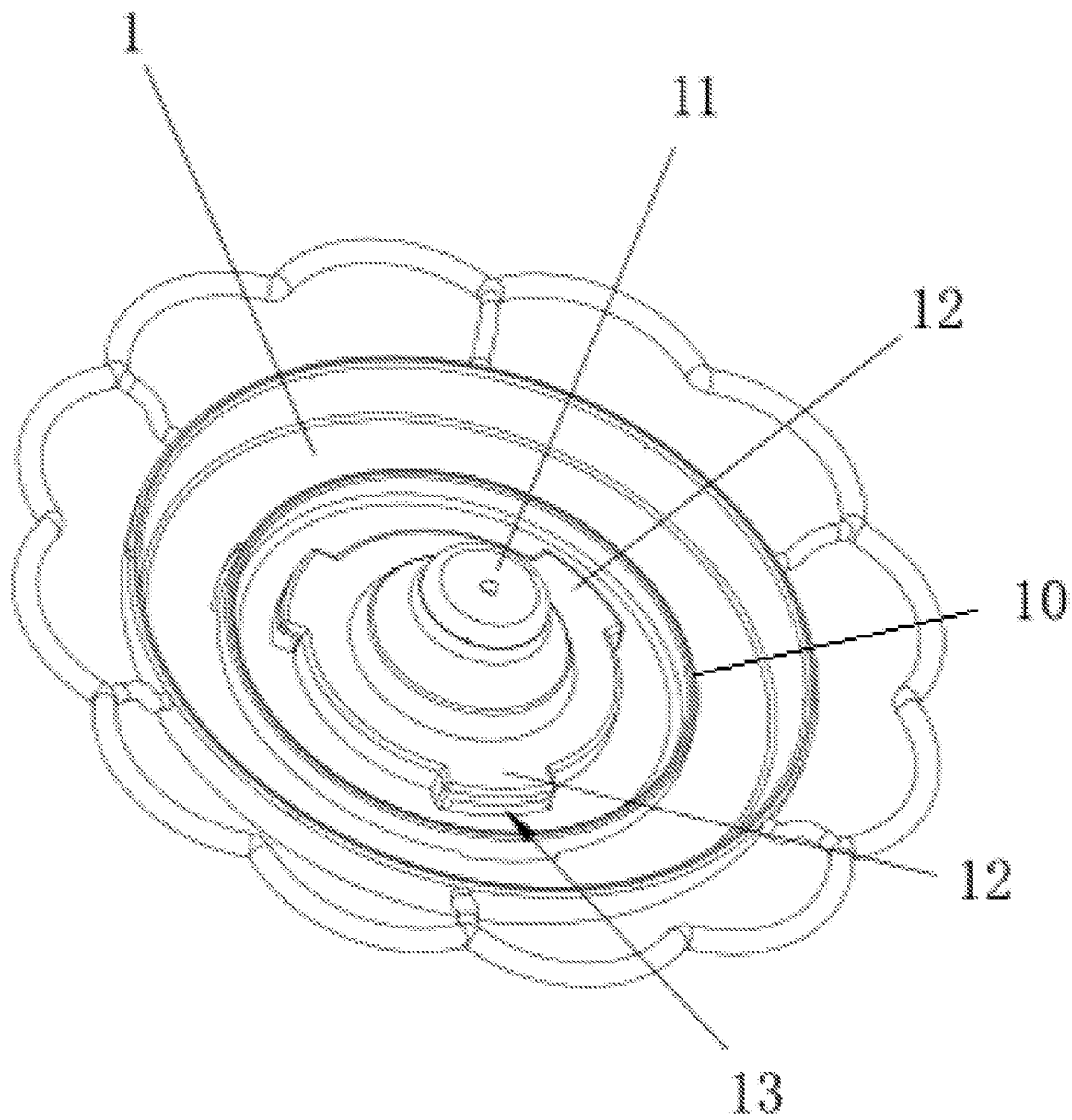
FIG. 6 is a perspective view of the feeding pan.
Figure 7:
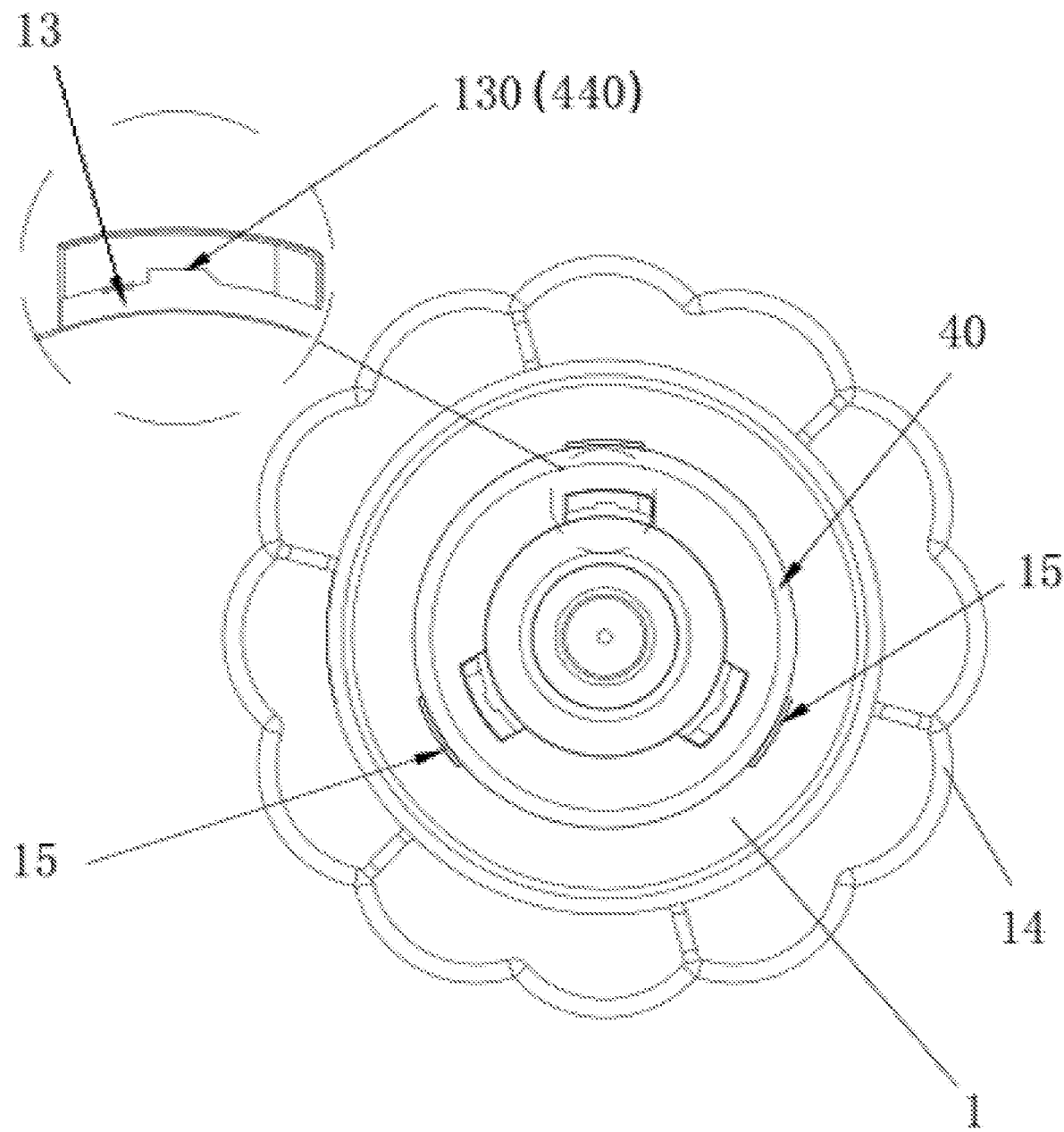
FIG. 7 is a top plan view of the feeding pan having one portion being greatly enlarged to show details.

As shown in FIGS. 2, 5 and 6 specifically, the discharging chamber 4 further comprises three protrusions 44 extending inward from a bottom edge, each protrusion 44 having a well 440 on an intermediate portion. The boss 11 comprises three spaced apart protuberances 12 extending outwardly from a bottom edge, each protuberance 12 having a sliding trough 13 with a projecting member 130 on an intermediate portion. The projecting member 130 is complimentarily engaged with the well 440 when the protrusion 44 is disposed in the sliding trough 13. Each opening 40 is disposed between two adjacent protrusions 44. The wall 10 is disposed around joining portions of the sliding troughs 13 and the protrusions 44.

Figure 3:
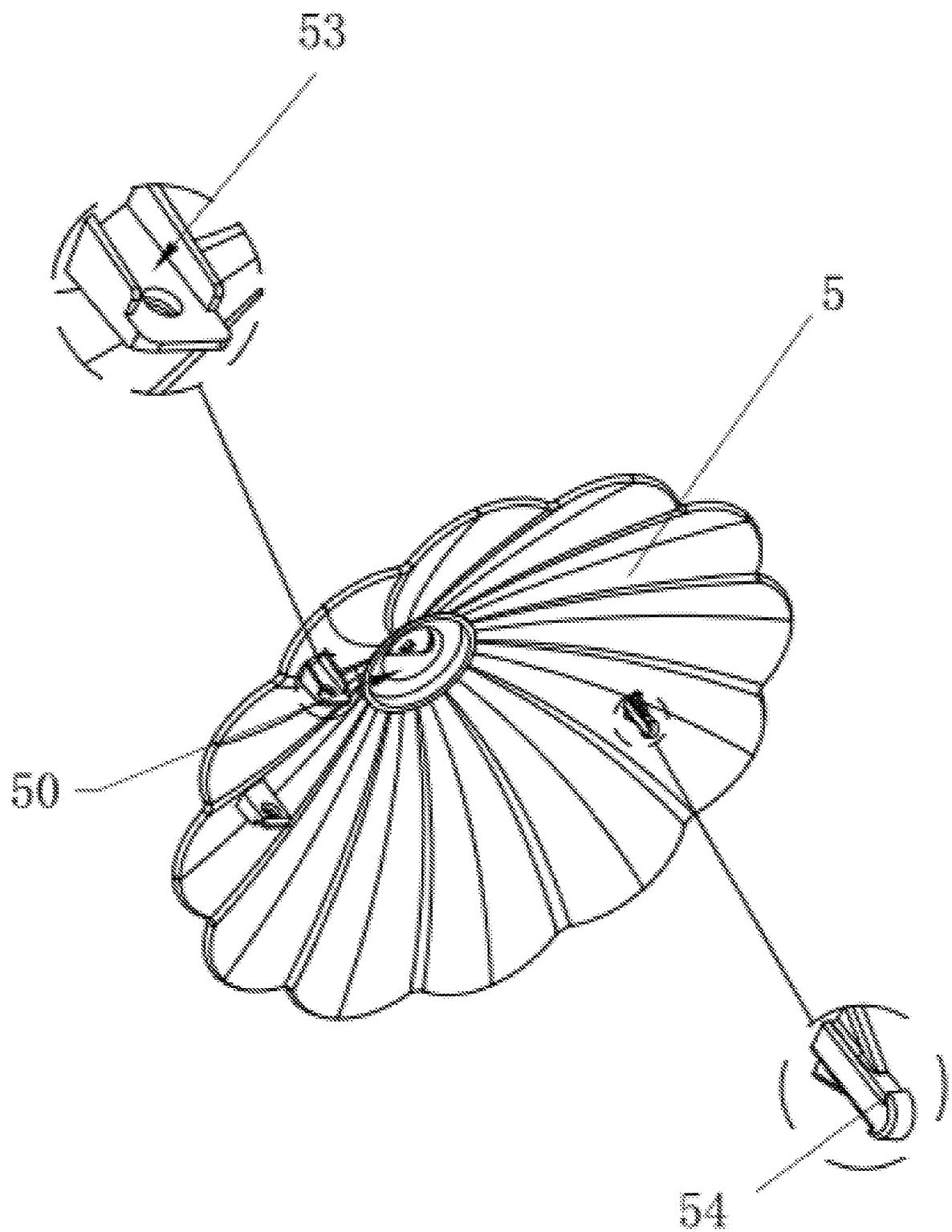
FIG. 3 is a perspective view of the cover having two portions being greatly enlarged to show details.

As shown in FIGS. 2, 3 and 4 specifically, the cover 5 further comprises two parallel adjacent holed members 53, and the feeding chamber 3 further comprises a hinge shaft 32 and a compression spring 33 put on the hinge shaft 32 and having a first end urging against the feeding chamber 3. The hinge shaft 32 has two ends passing through the holed members 53 with a second end of the compression spring 33 urging against an inner surface of the cover 5. The cover 5 further comprises a latch 54 extending downward and being opposite to the holed members 53. The feeding chamber 3 further comprises a recessed member 35 on an upper edge opposite to the hinge shaft 32, and a second biased button 34 disposed in the recessed member 35. Also, the latch 54 is releasably fastened in the recessed member 35 by the second biased button 34 and in a normal position, the latch 54 is fastened by the second biased button 34. Two rubber pads 36 are provided on the top edge of the feeding chamber 3 with the recessed member 35 disposed therebetween.

Figure 8:
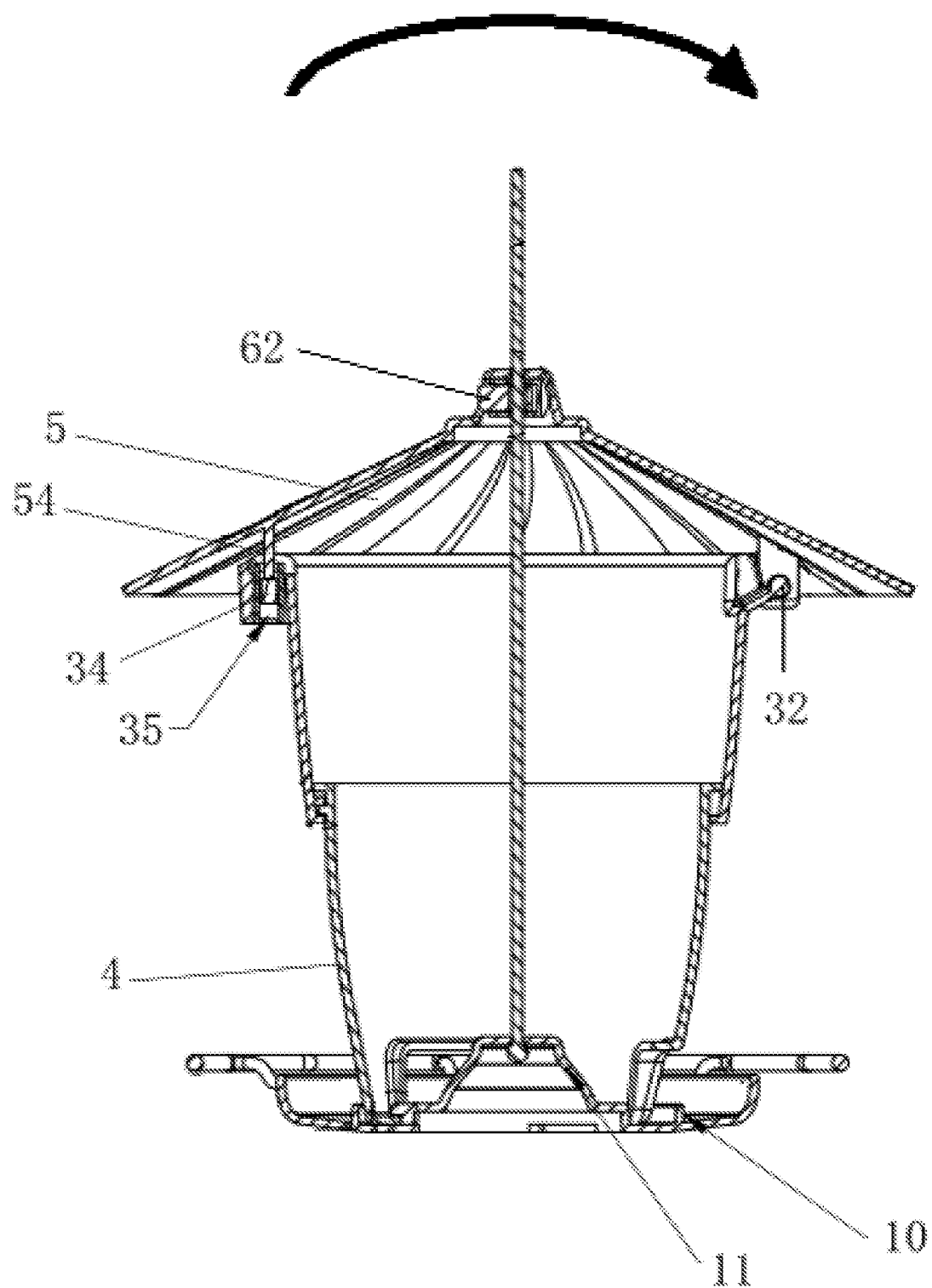
FIG. 8 is a view similar to FIG. 2 showing a clockwise pivoting operation to open the cover.

As shown in FIG. 8 specifically, an operator may press the first biased button 62 to spring it into another position to unfasten the rope 52. Further, the operator may press the second biased button 34 to unfasten the latch 54. Furthermore, the operator may clockwise pivot the cover 5 with respect to the seed container 2 about the hinge shaft 32 to open the seed container 2.

Figure 9:
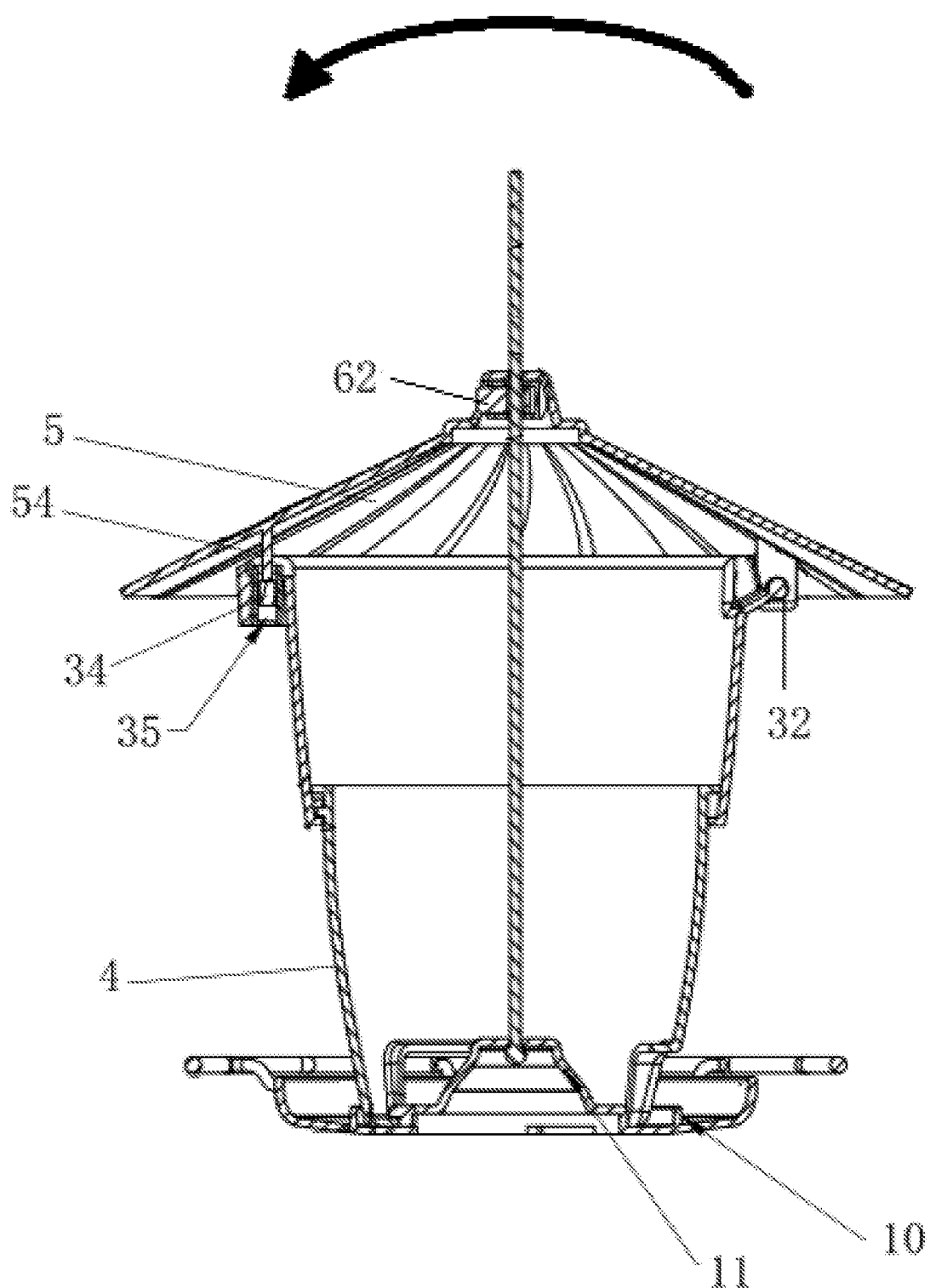
FIG. 9 is a view similar to FIG. 8 showing a counter-clockwise pivoting operation to close the cover.

As shown in FIG. 9 specifically, once the cover 5 is open, the operator may counterclockwise pivot the cover 5 with respect to the seed container 2 about the hinge shaft 32 to close the seed container 2 with the rope 52 being fastened by the first biased button 62 and the latch 54 being fastened by the second biased button 34 respectively.

It is envisaged by the invention that it is possible of preventing the cover 5 from being accidentally disengaged from the seed container 2.

Figure 10:
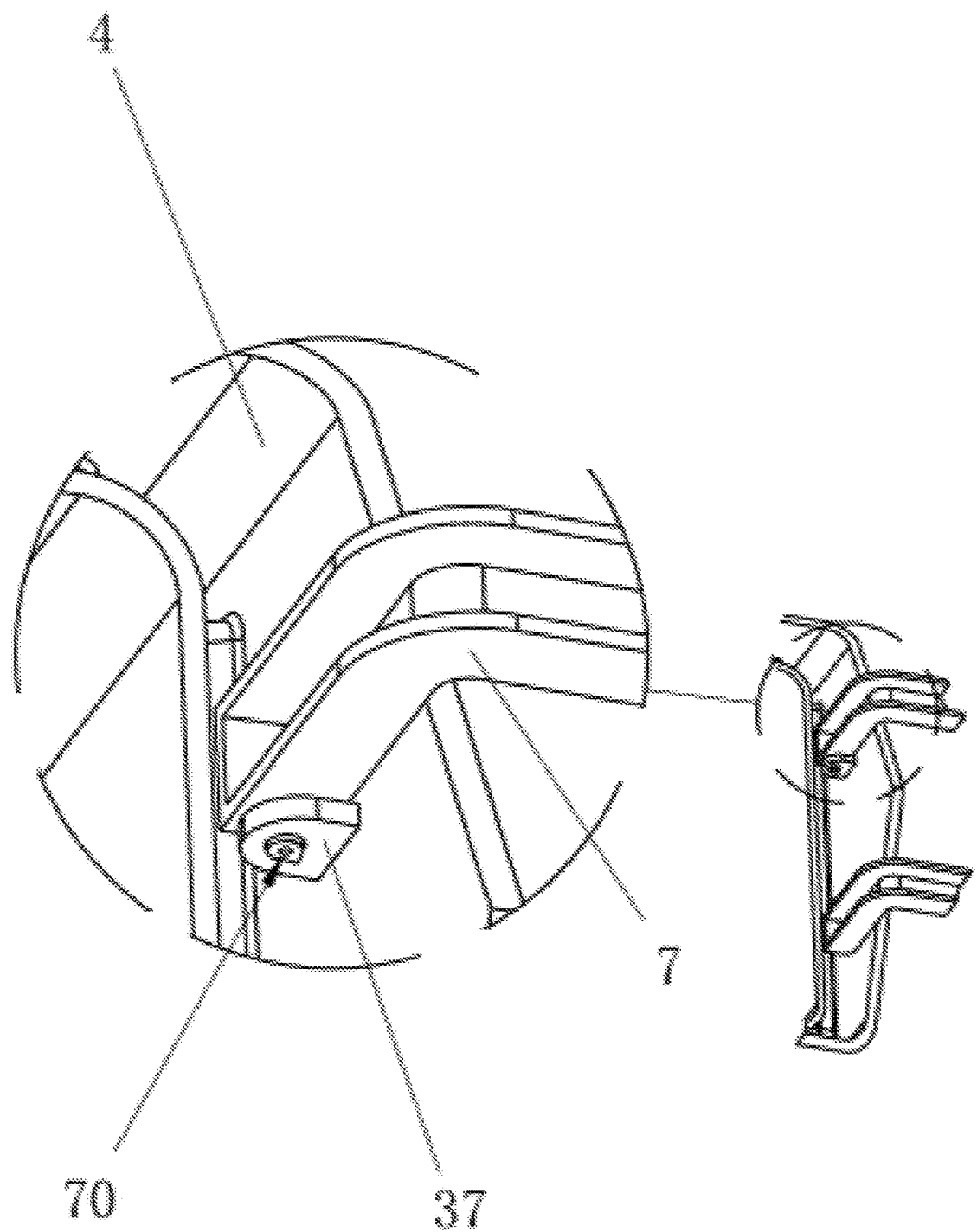
FIG. 10 schematically shows a bird feeder according to a second preferred embodiment of the invention.
Figure 11:
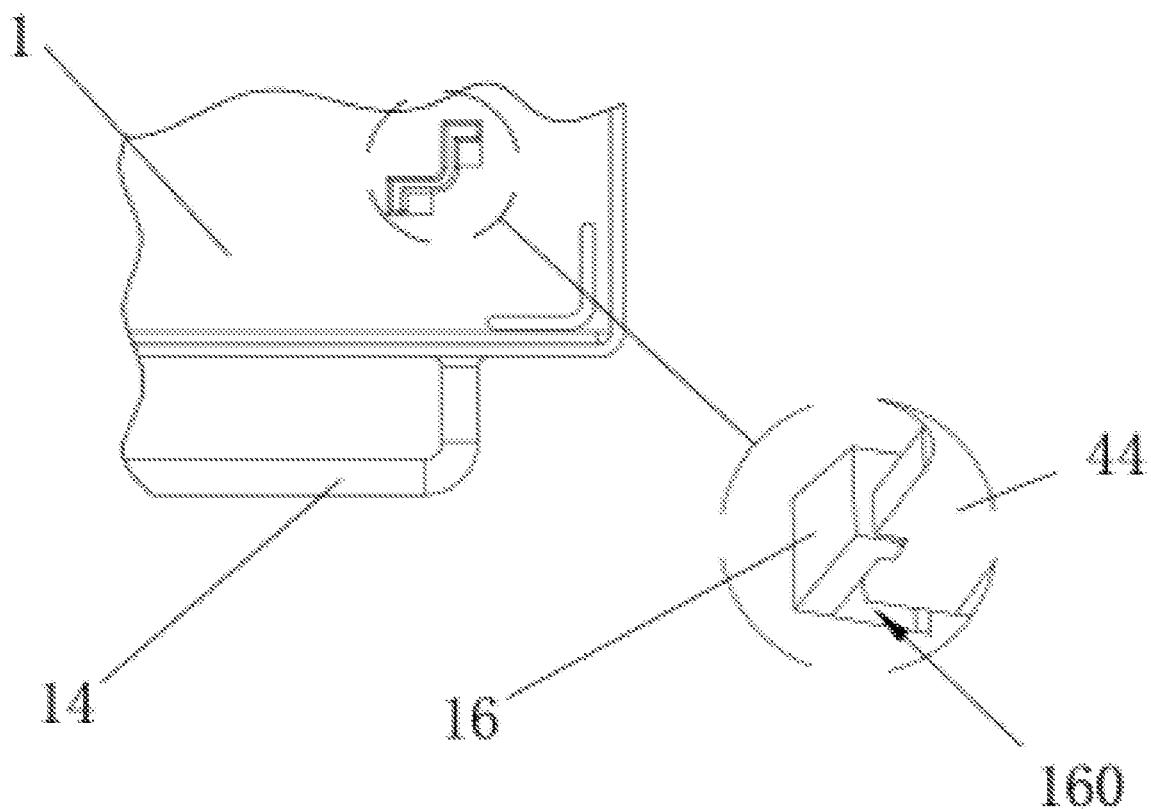
FIG. 11 schematically shows a bird feeder according to a third preferred embodiment of the invention.

Referring to FIG. 10, a bird feeder in accordance with a second preferred embodiment of the invention is shown. The characteristics of the second preferred embodiment are substantially the same as that of the first preferred embodiment except the following: the cover 5 comprises two bent bifurcated members 7 on an inner surface. The bent bifurcated member 7 includes a hinge shaft 70 through one part. The feeding chamber 3 comprises two holed members 37 on an inner surface each with the hinge shaft 70 mounted through to hingedly secure the cover 5 to the feeding chamber 3. Thus, an open or closing operation of the cover 5 is made easier.

Referring to FIG. 9, a bird feeder in accordance with a third preferred embodiment of the invention is shown. The characteristics of the third preferred embodiment are substantially the same as that of the first preferred embodiment except the following: Four M-shaped clasps 16 are provided on the feeding pan 1 on a bottom. The M-shaped clasp 16 includes a sliding groove member 160. The discharging chamber 4 includes two rail members 44 on a bottom, the rail members 44 being configured to slide into the sliding groove members 160 to assemble the feeding pan 1 and the discharging chamber 4. This is simpler and easier.

While the invention has been described in terms of preferred embodiments, those skilled in the art will recognize that the invention can be practiced with modifications within the spirit and scope of the appended claims.

What is claimed is:

1. A bird feeder comprising:
a cover comprising a hub extending upward, a lateral receptacle in the hub, and a latch extending downward;
a feeding pan;
a positioning mechanism disposed in the lateral receptacle and comprising an open cavity, a first biased button in the open cavity and partially extending out of the lateral receptacle, and a longitudinal hole through the open cavity;
a seed container disposed on the feeding pan and comprising a feeding chamber hingedly secured to the cover and a discharging chamber releasably secured to the feeding chamber and the feeding pan respectively wherein the feeding chamber includes a recessed member disposed on an upper edge, and a second biased button disposed in the recessed member; and
a rope passing through the longitudinal hole and the hub to extend out of the cover;
wherein the rope is fastened by the first biased button in a closed state of the cover, and the first biased button is configured to unfasten the rope by pressing; and wherein the latch is fastened in the recessed member by the second biased button in the closed state of the cover, and the second biased button is configured to unfasten the latch by pressing.

2. The bird feeder of claim 1, wherein the discharging chamber includes a plurality of openings on a bottom edge, a plurality of spaced rails on an outer surface adjacent to a top edge, each rail having a recess on a bottom, an outwardly extending sealing ring on the top edge, the sealing ring having a height equal to that of the rail, and a plurality of protrusions extending inward from a bottom edge, each opening being disposed between two adjacent protrusions, each protrusion having a well on an intermediate portion; and wherein the feeding chamber further comprises a plurality of sliding grooves on an inner surface adjacent to a bottom edge, each sliding groove having a projection on a bottom, the projection being lockingly disposed in the recess when the rail is disposed in the sliding groove.

3. The bird feeder of claim 2, wherein the feeding pan comprises a cylindrical wall around the discharging chamber, a plurality of spaced drain holes through the cylindrical wall, and a central boss inside the cylindrical wall, the central boss being secured to a first end of the rope and including a plurality of spaced apart protuberances extending outwardly from a bottom edge, each protuberance having a sliding trough with a projecting member on an intermediate portion, the projecting member being complimentarily engaged with the well when the protrusion is disposed in the sliding trough.

4. The bird feeder of claim 3, wherein the feeding pan further comprises a decorated perch along an edge.

\* \* \* \* \*